United States Patent [19]

Yoshida

[11] Patent Number: 4,689,694
[45] Date of Patent: Aug. 25, 1987

[54] IMAGE RECORDING APPARATUS UTILIZING LINEARLY ARRANGED RECORDING ELEMENTS

[75] Inventor: Tadashi Yoshida, Tokyo, Japan

[73] Assignee: Canon Kabushiki Kaisha, Tokyo, Japan

[21] Appl. No.: 846,332

[22] Filed: Mar. 31, 1986

Related U.S. Application Data

[63] Continuation of Ser. No. 566,555, Dec. 29, 1983, abandoned.

[30] Foreign Application Priority Data

Jan. 12, 1983 [JP] Japan .................................. 58-2291
Jan. 12, 1983 [JP] Japan .................................. 58-2292
Jan. 12, 1983 [JP] Japan .................................. 58-2293

[51] Int. Cl.$^4$ .......................... H04N 1/21; G01D 9/42
[52] U.S. Cl. .................................... 358/298; 358/296; 346/107 R; 346/108
[58] Field of Search .................. 358/298, 302, 296; 346/154, 160, 75, 76 PH, 107 R, 108

[56] References Cited

U.S. PATENT DOCUMENTS

| 4,141,018 | 2/1979 | Mizuguchi et al. ............ 346/154 X |
| 4,434,431 | 2/1984 | Ohkubo et al. ...................... 346/154 |
| 4,596,995 | 6/1986 | Yamakawa et al. ................. 346/160 |

Primary Examiner—E. A. Goldberg
Assistant Examiner—Linda M. Peco
Attorney, Agent, or Firm—Fitzpatrick, Cella, Harper & Scinto

[57] ABSTRACT

There is disclosed a recording apparatus with plural light-emitting elements. The elements are divided into plural groups, and in each group plural light-emitting elements receive image signals simultaneously to improve print quality in relation to subsidiary scanning. Also each light-emitting element is intensity modulated to reproduce a halftone image without the use of dither process.

7 Claims, 9 Drawing Figures

(A)

(B)

| DMSB | DLSB | IF(LED) |
|---|---|---|
| 0 | 0 | 0 |
| 0 | 1 | IFA |
| 1 | 0 | IFB |
| 1 | 1 | IFA+IFB |

IMAGE RECORDING APPARATUS UTILIZING LINEARLY ARRANGED RECORDING ELEMENTS

This is a continuation of application Ser. No. 566,555 filed Dec. 29, 1983, now abandoned.

BACKGROUND OF THE INVENTION

1. Field of the Invention

The present invention relates to an image recording apparatus for recording an image with recording elements, and more particularly to such apparatus utilizing light-emitting elements such as light-emitting diodes.

2. Description of the Prior Art

In the field of facsimile receiver or the computer output peripheral, there is already known a printer for image recording with an array of recording elements such as light-emitting diodes (LED). The printing head of such printer utilizing LED's as the recording elements is generally constructed as shown in FIG. 1, in which the printing head 1 comprises a linear array of for example 4096 LED's, which are divided into 64 blocks each containing 64 elements. Cathodes of 64 LED's in each block are connected to a common line B1, B2, . . . , or B64 which is common to each block, while anodes of the LED's of a same ordinal number in different blocks are connected to a common line D1, D2, . . . , or D64. Such LED printing head is generally driven by so-called dynamic driving method, in which the common lines D1–D64 for the anodes are selectively given a determined voltage V through unrepresented switching elements controlled by parallel pixel signals, while the different blocks of the cathodes are grounded in succession in synchronization with the supply of said pixel signals.

In the LED printer utilizing such dynamic drive, subsidiary scanning is achieved by a movement of a photosensitive member such as a photosensitive drum or sheet at a constant speed at the end of a main scanning process achieved by the above-explained dynamic drive. FIG. 2 shows an example of arrangement for achieving such function, wherein shown are an LED printing head 1, a linear array 2 of plural LED's mounted in said printing head 1, a photosensitive drum 3 rotated at a constant speed in a direction indicated by an arrow, and a rod lens array 4 for focusing the light from the LED array 2 onto the photosensitive drum 3. In such arrangement, however, since the photosensitive drum 3 is rotated at a constant speed even during the above-described dynamic scanning process, there may result a stepwise aberration in the exposure positions between different blocks due to the presence of an inactive period of LED between different blocks. Also in such printer the LED's have to be driven with a high efficiency since the light of an LED is much weaker than the light of a laser or the like and also since only 3 to 5% of the entire emitted light can be focused on the photosensitive member 3.

In such conventional LED printer, the image is formed on the photosensitive member by turning on or off each LED according to binary digital image signals. Consequently, a halftone image such as a photograph can only be reproduced by so-called dither process, which not only complicates the circuitry but also leads to a lowered resolving power as the image density is represented in the dither process by the number of plural dots constituting a pixel area.

SUMMARY OF THE INVENTION

In consideration of the foregoing, an object of the present invention is to provide an image recording apparatus capable of satisfactory image recording.

Another object of the present invention is to provide an image recording apparatus capable, in dynamic drive of plural blocks of recording elements by converting serial image signals into parallel signals in each block, of reducing stepwise positional aberration of exposures between different blocks caused by subsidiary scanning, and also capable of efficient utilization of the light power from low-powered light-emitting elements such as light-emitting diodes.

Still another object of the present invention is to provide an image recording apparatus capable of providing a halftone image with a simple circuit structure and without the use of the dither process or the like, by modulating the intensity of the light from the recording element in multiple-step levels, such as a light-emitting element providing $2^n$ levels corresponding to an n-bit digital signal constituting a pixel.

Still another object of the present invention is to provide an image recording apparatus capable of providing a halftone image with a simple circuit structure and without the use of the dither process or the like by modulating the intensity of the light from the light-emitting element by means of n switching elements and n current limiting resistors corresponding to an n-bit image signal constituting a pixel.

The foregoing and still other objects of the present invention, and the advantages thereof, will become fully apparent from the following description which is to be taken in conjunction with the attached drawings.

DETAILED DESCRIPTION OF THE PREFERRED EMBODIMENTS

Now the present invention will be clarified in greater detail by embodiments thereof shown in the attached drawings.

Figure 3:
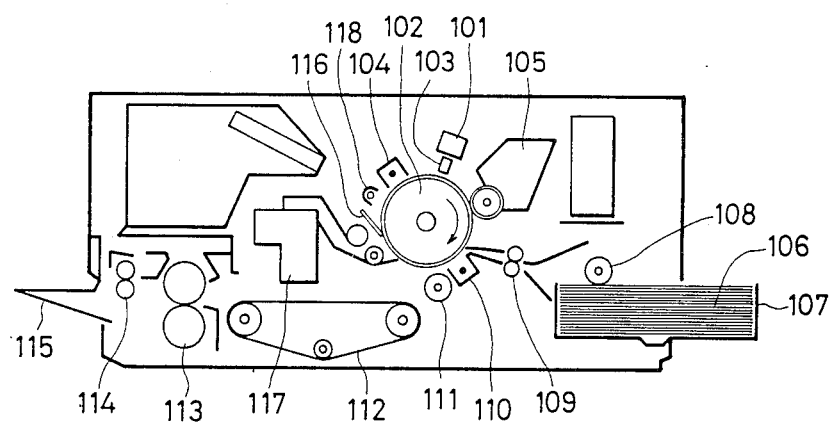
FIG. 3 is a cross-sectional view of an image recording apparatus embodying the present invention.

FIG. 3 schematically shows an image recording apparatus embodying the present invention, wherein shown are an LED printing head 101 containing 4096 LED's controlled according to recording signals supplied from an unrepresented external device; a rotary drum 102 provided with a photosensitive member along the periphery thereof; a rod lens array 103 for focusing the light beams of the LED's in the printing head 101 onto the photosensitive surface of the drum 102; a corona charger 104 for charging the photosensitive member in advance; a developing station 105 for developing an electrostatic latent image with toner; a recording sheet 106; a cassette 107 housing a plurality of recording sheets 106; a feed roller 108 for feeding the recording sheet 106 from the cassette 107; registration rollers 109 for matching the front end of the recording sheet with the leading end of the image formed on the drum 102; a transfer charger 110 for transferring the developed image from the drum 102 onto the recording sheet 106; a separating roller 111 for separating the recording sheet from the drum 102; a belt 112 for transporting the recording sheet; fixing rollers 113; discharge rollers 114 for discharging the recording sheet onto a tray 115; a blade cleaner 116 for removing the toner remaining on the drum 102; a container 117 for the recovered toner; and a lamp 118 for eliminating charge remaining on the drum 102.

The function of the above-described apparatus is as follows. Upon turning on of an unrepresented main switch, there are activated a motor for rotating the drum 102, the lamp 118 and the corona charger 104, thus eliminating the toner, charge and hysteresis remaining on the drum. Then a recording enable signal is released to the external device when the fixing rollers 113 reach a fixing temperature by means of an internal heater.

In response to recording information supplied from the external device, the LED's in the printing head 101 emit light beams which are guided to the drum 102 through the rod lens array 103. The charge formed on the drum 102 by the charger 104 is selectively eliminated, in the exposure position, by the light beams from the printing head 101, thus forming an electrostatic latent image on said drum. Said latent image is rendered visible by toner deposition in the developing station 105, and the visible image thus obtained is transferred onto the recording sheet by means of the transfer charger 110. Said recording sheet is supplied from the cassette 107 by the timed function of the feed roller 103, and passes through the image transfer position, by means of the registration rollers 109, at a speed same as the peripheral speed of the drum.

After said image transfer, the recording sheet is separated by the separating roller 111, then supplied by the belt 112 to the fixing rollers 113 for image fixation, and discharged by the roller 114 onto the tray 115.

The drum surface after the image transfer is cleaned with the blade cleaner 116 and is exposed to the light from the lamp 118 for erasing the hysteresis.

Figure 4:
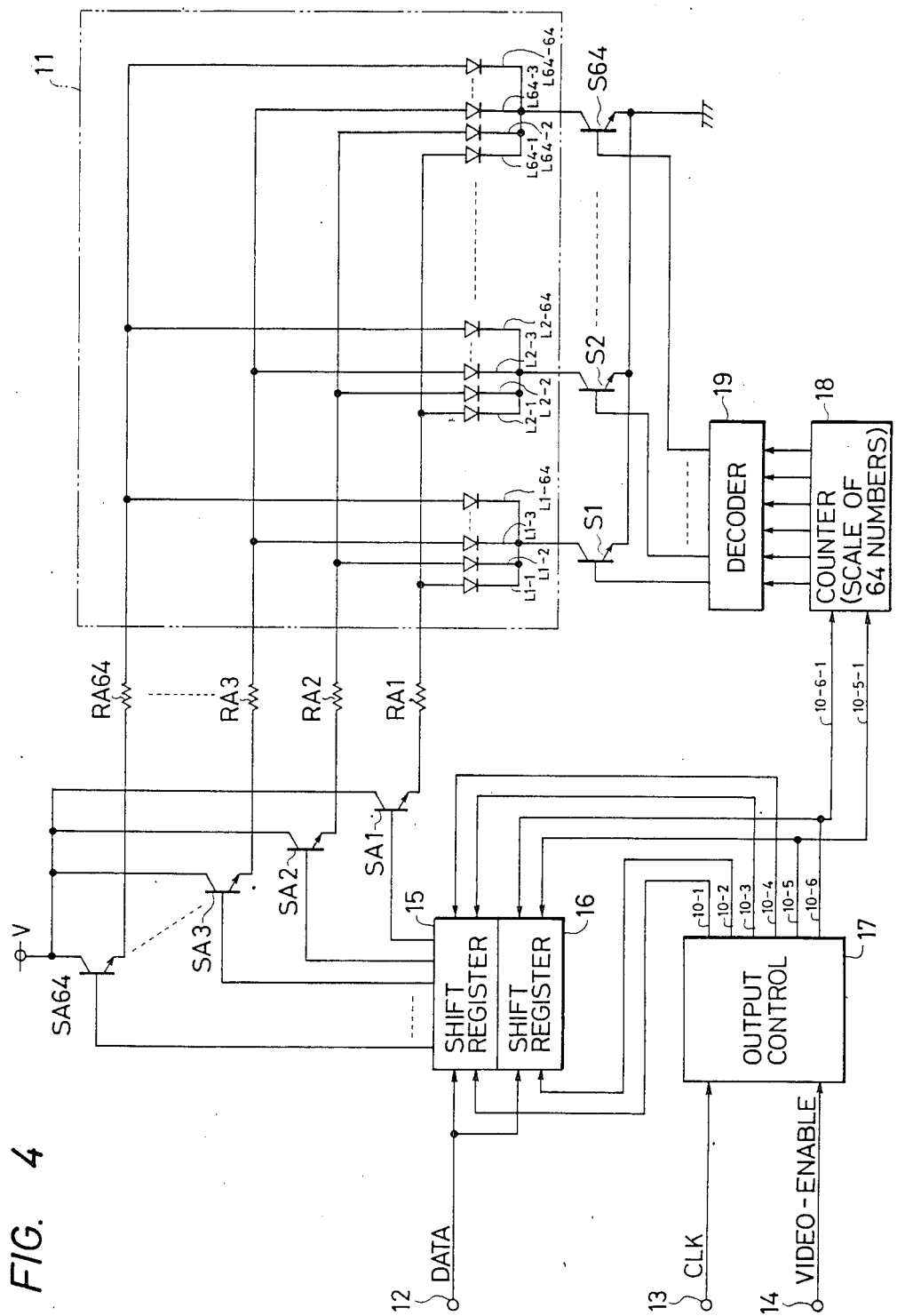
FIG. 4 is a block diagram showing an LED printer embodying the present invention.

FIG. 4 shows an embodiment of a driving circuit for the LED printer of the present invention, wherein an LED printing head 11 is same as that shown in FIG. 3 and comprises a linear array of plural LED's of a number corresponding to the number of dots constituting a scanning line. Said LED's are usually divided into a certain number of blocks, and the LED's of a same ordinal number in different blocks are connected to a common line to achieve dynamic drive. As an example, 4096 LED's L1-1-L64-64 arranged linearly are divided into blocks L1-1-L1-64; L2-1-L2-64; ..., L64-1-L64-64, each containing 64 LED's, and the cathodes of said LED's are grouped in said blocks and grounded through switching elements composed of transistors S1-S64, while the anodes of LED's of a same ordinal number in different blocks are connected to a common line. Said LED's L1-1-L64-64 are lighted by a voltage V supplied through current limiting resistors RA1-RA64 and switching elements or transistors SA1-SA64 controlled according to digital image signals DATA, and said LED lighting takes place only in a block selected by the switching elements S1-S64.

There are also shown an input terminal 12 for entering serial digital image signals DATA of a scanning line; an input terminal 13 for entering image signal transfer clock pulses CLK; an input terminal 14 for entering a period signal VIDEO-ENABLE indicating the effective period of serial image signals DATA of a scanning line; 64-bit serial-in-parallel-out shift registers 15, 16 functioning as buffer memories which alternately receive 64 bits of the serial image signals DATA supplied from the input terminal 12 wherein either supplies the image signals DATA to the switching elements SA1-SA64 while the other receives the succeeding image signals DATA; and an output control unit 17 for controlling the output signals from the shift registers 15, 16 and the switching elements S1-S64 in succession to achieve dynamic scanning.

A 64-bit counter 18 counts clock signals 10-5-1, to be supplied from the output control unit 17, from "0" to "63" each time the image signals DATA of a block are released from the shift register 15. A decoder 19 with 6 input lines and 64 output lines for decoding the binary count of the counter 18, activates the switching elements S1-S64 in succession corresponding to the count of the counter 18.

Figure 5:
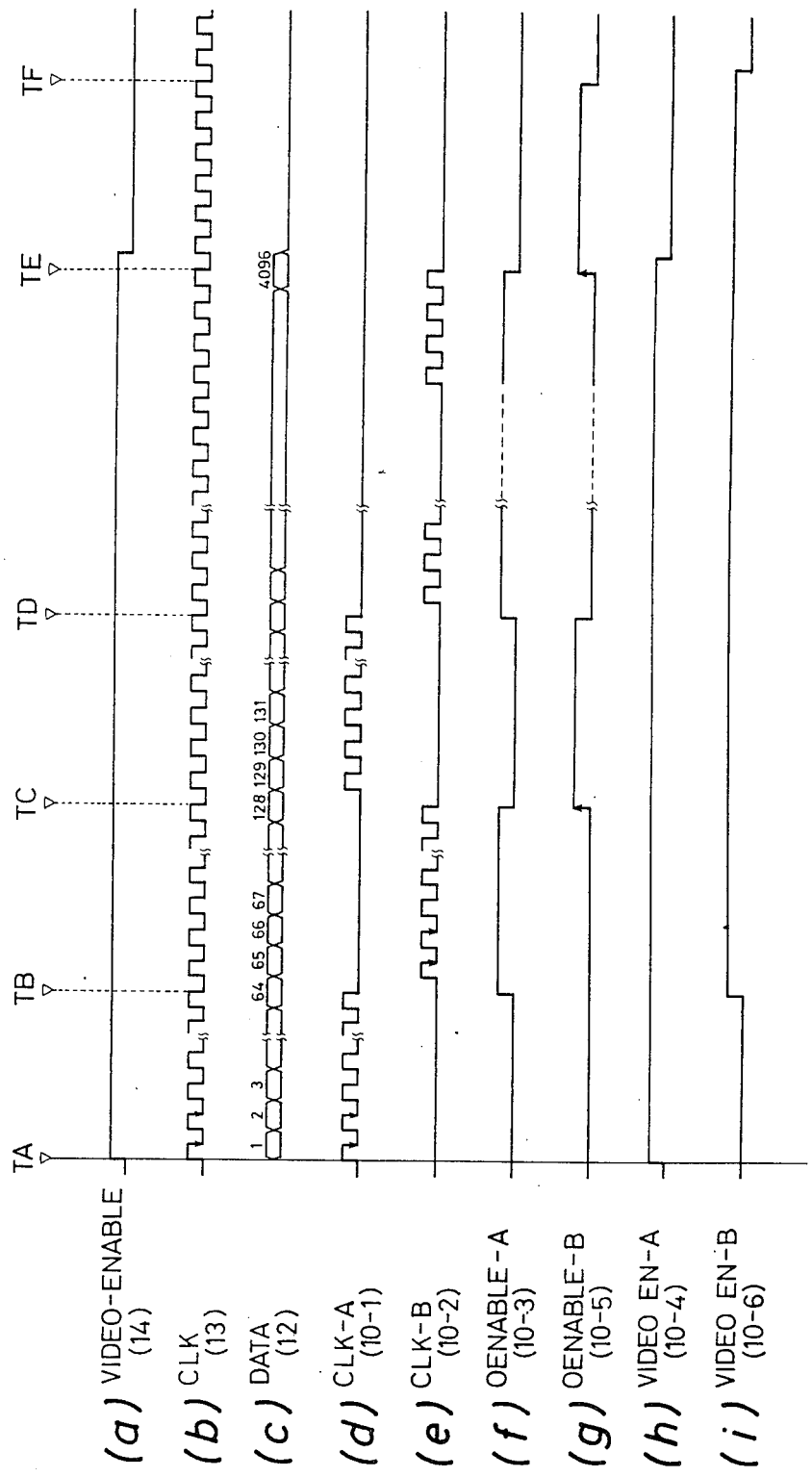
FIG. 5 is a timing chart showing various signals in the apparatus shown in FIG. 3.

Now the function of the LED printer shown in FIG. 4 will be explained further in relation to the timing chart shown in FIG. 5, wherein the parenthesized numbers (12-14 and 10-1-10-6) attached to curves (a) to (i) correspond to the number of the input terminals and signal lines shown in FIG. 4. At first, at a timing TA corresponding to the start of a period signal VIDEO-ENABLE supplied from the terminal 14 (curve (a) in FIG. 5) and also to the end of a clock pulse CLK supplied from the terminal 13 (curve (b) in FIG. 5), the serial image signals DATA entered from the terminal 12, from the 1st to 64th pixels, are supplied to the first shift register 15. More specifically said clock pulses CLK are transmitted by the output control unit 17 as signal CLK-A (curve (d) in FIG. 5) to the shift register 15 through a signal line 10-1, whereby the signals of the first 64 pixels alone (curve (c) in FIG. 5) are stored in said shift register 15 in synchronization with the end of said clock signals CLK-A.

At a next timing TB, succeeding 64 bits of the serial image signals DATA, from 65th to 128th pixels, entered from the terminal 12, are stored in the second shift register 16. More specifically, at said timing TB, the image signal transfer clock signal CLK-A is replaced by CLK-B (curve (e) in FIG. 5) which is supplied through a signal line 10-2 to the shift register 16 to store the image signals, from the 65th bit to 128th bit, in the same manner as explained before, prior to a next timing TC. Also at said timing TB, the output control unit 17 releases an output enable signal OENABLE-A (curve (f) in FIG. 5) through a signal line 10-3 to the shift register 15, thereby supplying the image signals of 64 bits from the shift register 15 to the switching elements SA1-SA64, thus controlling said switching elements according to the image signals.

In this state the counter 18 receives a clock signal 10-5-1 and an output enable signal 10-6-1 from the output control unit 17. The clock signal 10-5-1 is identical with the output enable signal OENABLE-B shown by a curve (g) in FIG. 5, and the counter 18 performs the counting operation at the start of each pulse in said signal. The output enable signal 10-6-1 corresponds to the output enable signal VIDEO EN-B shown by a curve (i) in FIG. 5, and the decoder 19 releases output signals only when said output enable signal is at the H-level state. During a period from TB to TC, the content of the counter 18 remains zero since the signal OENABLE-B assumes the H-level state only at the timing TC, and the signal VIDEO EN-B assumes the H-level state at the timing TB whereby the switching element S1 decoded by the decoder 19 is turned on alone. Consequently, in said period from TB to TC, the LED's L1-1 TO L1-64 are activated corresponding to the image signals of the first 64 bits.

In a succeeding period from TC to TD, the image signals, from 129th to 192th pixel, are stored in the shift register 15. Simultaneously the output control unit 17 controls the shift register 16 by the output enable signal OENABLE-B supplied through a signal line 10-5, whereby the image signals from the 65th to 128th bit are supplied from the shift register 16 to the switching elements SA1-SA64. In this state the counter 18 assumes a count "1" at the start of the clock signal 10-5-1 or signal OENABLE-B to select the switching element SA2 through the decoder 19, thus activating the LED's L2-1-L2-64.

The above-described procedure is repeated until a timing TE to supply the image signals of 4096 bits of a scanning line, to the switching elements SA1-SA64, 64 bits at a time. Then in a succeeding period from TE to TF, the final image signals stored in the shift register 16 are released to complete the printing of a scanning line. The output enable signals VIDEO EN-A and VIDEO EN-B (shown respectively by curves (h) and (i) in FIG. 5) are supplied from the output control unit 17 through the signal lines 10-4, 10-6 to the shift registers 15, 16, each of which does not release an output signal nor performs shifting operation when the corresponding output enable signal is "0".

In the above-explained printing operation, the lighting time T of the LED's in a block corresponds to the time required for the storage of the serial image signals of 64 bits into the shift register 15 or 16. Also said lighting time T corresponds to 64 times of a speed 1/f required for the shifting of a pixel in the shift register 15 or 16, wherein f stand for the frequency of the image signal transfer clock signal. In more general terms there is obtained a relation:

$$T = m/f \quad (1)$$

wherein m represents the number of LED's in a block. The lighting time T defined by the above-explained equation can be used for achieving maximum utilization of the light power of LED's and minimizing the stepwise positional aberration between different blocks resulting from the subsidiary scanning, thus allowing to obtain a straight line in the main scanning direction. In the foregoing embodiment the LED's are employed as the light-emitting elements, but the present invention is naturally applicable to other light-emitting elements such as electroluminescent elements.

As explained in the foregoing, minimization of the stepwise positional aberration in the exposure resulting from the subsidiary scanning and efficient utilization of the light power of the light-emitting elements are achieved by the use of plural buffer memories of a respective bit capacity corresponding to the number m of the light-emitting elements in a block, wherein the lighting time T of the light-emitting elements in each block is controlled by said buffer memories in such a manner as to satisfy a relation $T=m/f$ in which f stands for the transfer frequency of the serial image signals entering said buffer memories.

It will be obvious that the present invention is further applicable to other printers such as an ink jet printer or a thermal printer.

In the foregoing embodiment, the image formation on the photosensitive member is achieved by turning on or off each LED according to a 1-bit binary digital image signal. Consequently a halftone image such as a photograph can only be produced through the use of so-called dither process.

In the following there will be disclosed an image recording apparatus capable of producing a halftone image in a more satisfactory manner.

Figure 6:
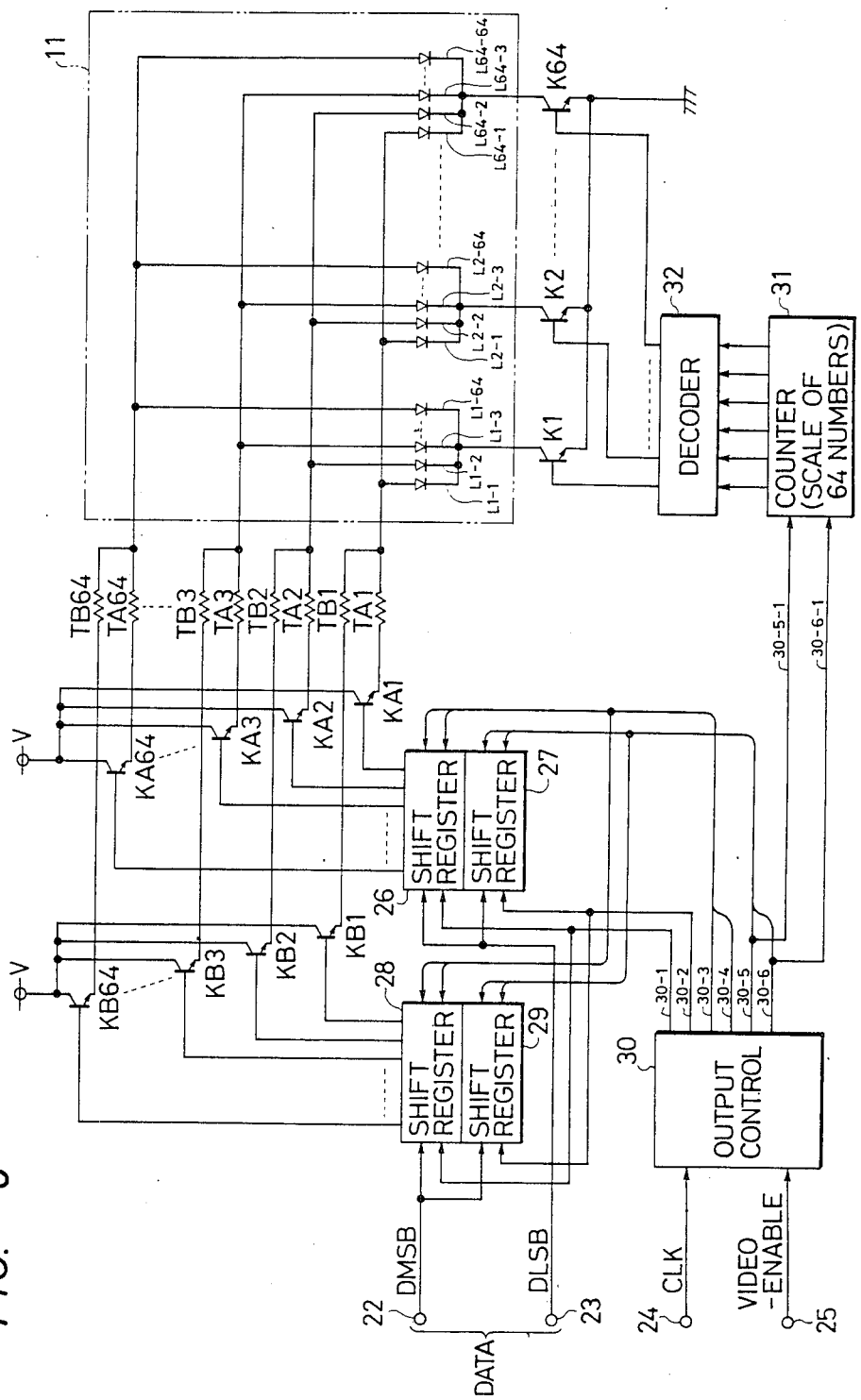
FIG. 6 is a block diagram showing another embodiment of the LED printer of the present invention.

FIG. 6 shows a second embodiment of the circuit for use in an LED printer of the present invention, wherein an LED printing head 11, similar to that shown in FIG. 4, comprises a linear array of plural LED's of a number corresponding to the number of dots constituting a scanning line. Said plural LED's are usually divided into plural blocks, and the LED's of a same ordinal number in different blocks are connected in common to drive the LED array by dynamic driving method. As an example, 4096 LED's L1-1-L64-64, arranged linearly, are divided into blocks L1-1-L1-64, L2-1 -L2-64, ..., L64-1-L64-64, each containing 64 LED's. The cathodes of said LED's are blockwise grounded through switching elements K1-K64 composed of transistors, while the anodes of LED's of a same ordinal number in different blocks are commonly connected.

The LED's of a same ordinal number is subjected to intensity modulation by means of a current limiting resistor TA (representative of TA1-TA64), a switching element composed of a transistor KA (representative of KA1-KA64), another current limiting resistor TB (representative of TB1-TB64) and another switching element composed of a transistor KB (representative of KB1-KB64). More specifically the switching element KA or KB is controlled according a 2-bit digital image signal, whereby a current is supplied to the LED's through the current limiting resistor TA or TB from a power source V. The LED's are lighted according to the digital image signals, only in a block selected by the switching elements K1-K64.

There are also shown input terminals 22, 23 for respectively entering, from an external device, image signals DMSB and DLSB which constitute serial digital image signals of 2 bits per pixel; an input terminal 24 for entering image signal transfer clock signal CLK; an input terminal 25 for entering a period signal VIDEO-ENABLE indicating the effective period of the serial image signals of a scanning line; 64-bit serial-in-parallel-out shift registers 26, 27 functioning as buffer memories which alternately receive the image signals DLSB entered from the input terminal 23, by every 64 bits, wherein either one supplies the image signals to the switching elements KA1-KA64 while the other receives the image signals DLSB of 64 bits as explained above; similar 64-bit serial-in-parallel-out shift registers 28, 29 functioning as buffer memories which alternately receive the image signals DMSB and supply the same to the switching elements KB1-KB64; and an output control unit 30 for controlling the output signal from the shift registers 26, 27, 28 and 29 and for successive switching of the switching elements K1–K64 connected to the respective blocks of the LED's L1-1–L64-64.

There are further shown a counter 31 for counting, from "0" to "63", clock pulses 30-5-1 released from the output control unit 30 in synchronization with the release of the image signals of a block from the shift registers 26–29; and a decoder 32 with 6 input lines and 64 output lines for decoding the binary count of the counter 31 thereby successively selecting the switching elements K1–K64.

Figure 7:
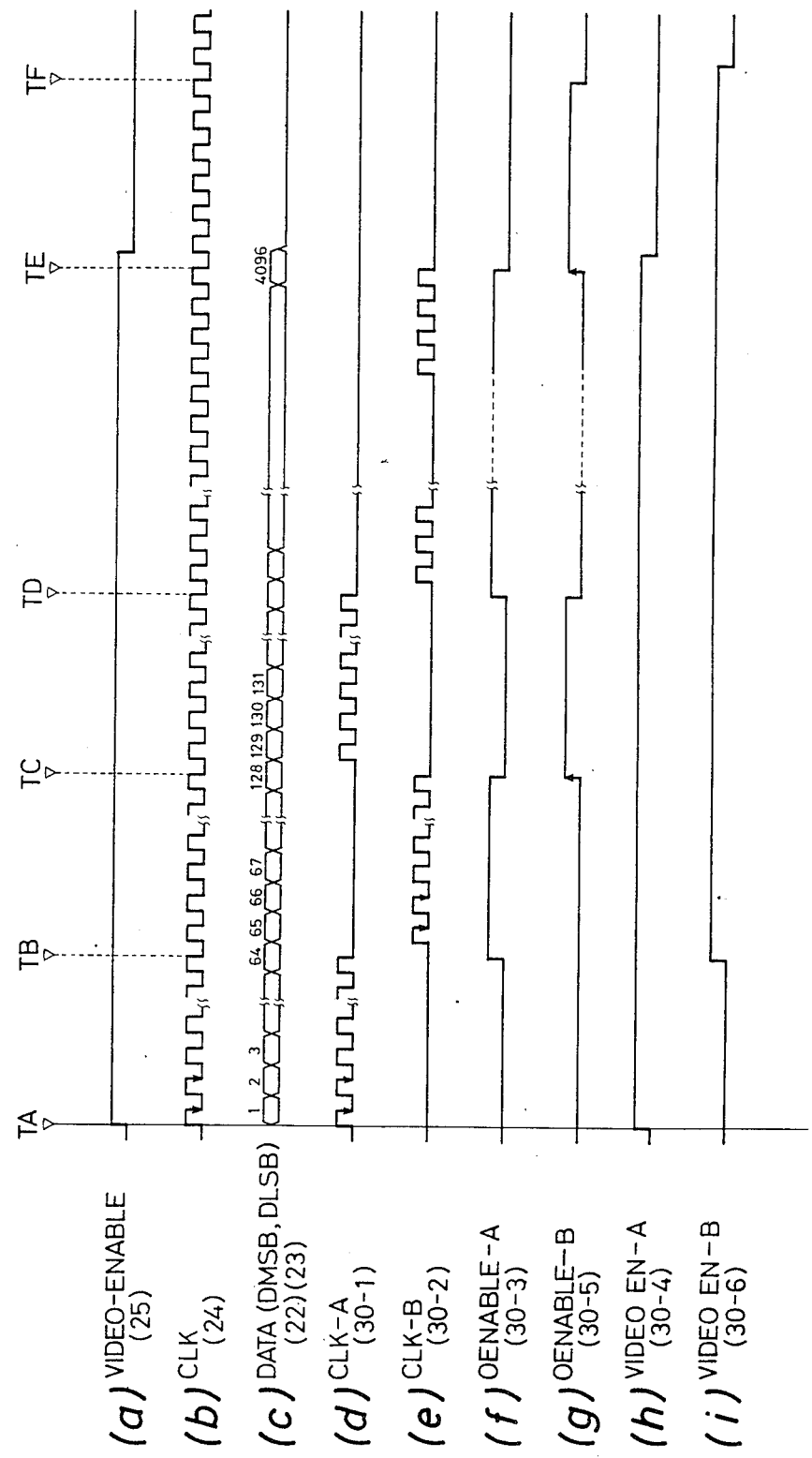
FIG. 7 is a timing chart showing various signals in the apparatus shown in FIG. 6.

Now there will be given an explanation on the function of the LED printer shown in FIG. 6, while making reference to a timing chart shown in FIG. 7, wherein the parenthesized numbers attached to the curves (a)–(i) correspond to the numbers of the input terminals and of signal lines shown in FIG. 6. At first, at a timing TA corresponding to the start of a period signal VIDEO-ENABLE (curve (a) in FIG. 7) entered from the terminal 25 and in synchronization with the end of clock pulses CLK (curve (b) in FIG. 7) from the terminal 24, the serial image signals DMSB, DLSB, 64 bits each, are supplied from the terminals 22, 23 to the shift registers 26, 28 constituting a first group. More specifically the image signal transfer clock signal CLK is transmitted by the output control unit 30 as clock signal CLK-A (curve (d) in FIG. 7 and supplied through a signal line 30-1 to the shift registers 26, 28, whereby said image signals DMSB, DLSB are stored in the shift registers 26, 28 in synchronization with the ends of said clock pulses CLK-A.

At a succeeding timing TB, the image signals DLSB and DMSB of 64 bits each are stored respectively in the shift registers 27, 28 constituting a second group. More specifically, at said timing TB, the image signal reception is switched from the shift registers 26, 28 to the shift registers 27, 29. During a period from TB to TC, the output control unit 30 supplies an output enable signal OENABLE-A (curve (f) in FIG. 7) to the shift registers 26, 28 through a signal line 30-3, whereby the image signals DLSB, DMSB of 64 bits each stored in said shift registers are supplied to the switching elements KA1–KA64, KB1–KB64 for controlling said elements according to said image signals. Also in said period from TB to TC the succeeding image signals of 64 bits each are respectively stored in the shift registers 27, 29 in the above-explained manner, and for this purpose the image signal transfer clock CLK is transmitted by the output control unit 30 as clock signals CLK-B (curve (e) in FIG. 7) and supplied to said shift registers 27, 29.

In this state the counter 31 receives a count signal 30-5-1 and an output enable signal 30-6-1 from the output control unit 30. The count signal 30-5-1 corresponds to the output enable signal OENABLE-B shown by a curve (g) in FIG. 7, and the counter 31 performs the counting operation at the start of each pulse of said count signal 30-5-1. The output enable signal 30-6-1 corresponds to the output enable signal VIDEO EN-B shown by a curve (i) in FIG. 7, and the decoder 32 releases the output signals only when said output enable signal is in the H-level state. During the period from TB to TC, the content of the counter 31 remains zero since the signal OENABLE-B assumes the H-level state only at the timing TC, and the signal VIDEO EN-B assumes the H-level state at the timing TB to activate the switching element K1 alone through the decoder 32. Consequently, in said period from TB to TC, the LED's L1-1–L1-64 of the first block are lighted corresponding to the image signals of the first 64 bits.

In a succeeding period from TC to TD, the succeeding image signals DATA (DMSB and DLSB), from the 129th to 192th bit, are stored in the shift registers 26, 28 by the image signal transfer clock CLK-A. Simultaneously the image signals of 64 bits each stored in the shift registers 27, 28 are supplied to the switching elements KA1–KA64, KB1–KB64 to activate the LED's L2-1–L2-64 of the second block. In this state the output enable signal OENABLE-B supplied from a signal line 30-5 to the shift registers 27, 29 assumes the H-level state indicating the permission for signal output. Also the counter 31 assumes a count "1" at the start of the count clock signal 30-5-1 thereby activating the switching element S2 through the decoder 32.

The above-described procedure is repeated until a timing TE to supply image signals of 4096 bits in a scanning line, in a unit of 64 bits at a time, to the switching elements KA1–KA64 and KB1–KB64. Subsequently, in a period from TE to TF, the final image signals of 64 bits stored in the shift registers 27, 29 are released to complete the printing of a scanning line.

Figure 1:
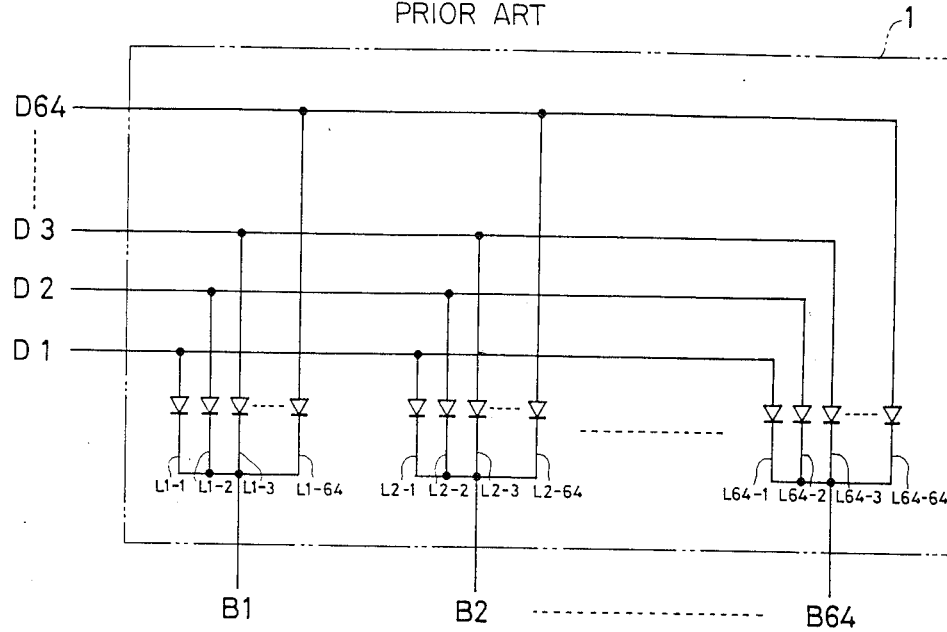
FIG. 1 is a circuit diagram showing an example of the principal circuit in a conventional apparatus.
Figure 2:
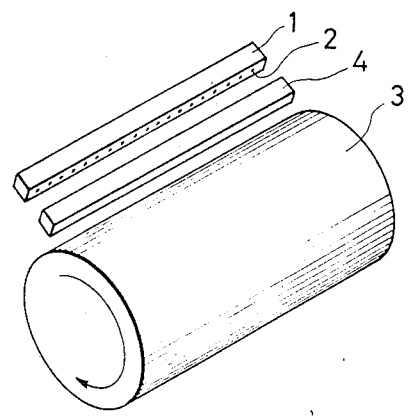
FIG. 2 is a perspective view showing an example of the principal parts in the conventional apparatus shown in FIG. 1.
Figure 8:
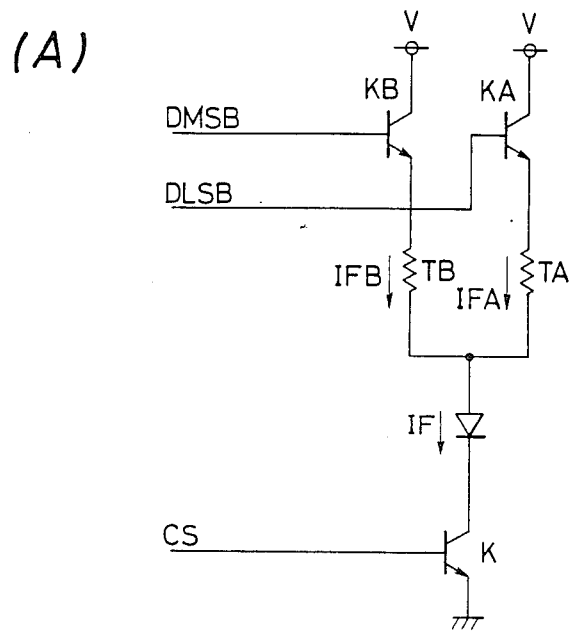
FIGS. 8(A) and 8(B) are a circuit diagram showing the principle of intensity modulation in the LED printer shown in FIG. 6 and a chart indicating the output characteristics.

FIGS. 8(A) and 8(B) show the principle of intensity modulation in the LED array shown in FIG. 6, wherein K is a switching element common to a block and corresponds to the switching elements K1–K64 shown in FIG. 1. It is now assumed that a base line CS is activated by the decoder 32 shown in FIG. 6, thereby activating the switching element K. In this state the switching elements KA and KB at the data line side are controlled according to the image signals DMSB and DLSB of 2 bits. FIG. 8(B) shows the current IF in the LED, wherein "1" indicates the active state of the image signal DMSB or DLSB. Thus an intensity modulation of four levels is rendered possible by selecting the current limiting resistors TA and TB in such a manner that the current IFA in the former is smaller than the current IFB in the latter. The density of each dot on the photosensitive member can be controlled by such intensity modulation.

In the foregoing description the image signal contains information of 2 bits per pixel, but a similar intensity modulation is possible for digital image signal containing 3 or bits per pixel. In more general terms, an intensity modulation of $2^n$ levels can be obtained from a digital signal of n bits, by means of n switching elements and n current limiting resistors. Also the LED may be replaced by other light-emitting elements capable of modulating light intensity, such as an electroluminescent element. Also the photosensitive drum may be replaced by a photosensitive sheet coated with a photosensitive material.

As explained in the foregoing, a halftone image of a high resolving power can be obtained with a simple circuit structure, since the density of each pixel is determined by the intensity modulation of $2^n$ levels of each light-emitting element corresponding to the digital image signal of n bits per pixel. Such intensity modulation of the light-emitting element is achieved by a simple circuit composed of n switching elements and n current limiting resistors for the image signal containing n bits per pixel.

The foregoing description has been limited to the embodiments in which light-emitting elements composed of LED's are used as the recording elements, but some of the present invention is applicable also to other printers such as a thermal printer or an ink jet printer.

What I claim is:

1. An image recording apparatus comprising:

recording means including a plurality of recording elements arranged in a linear configuration and each adapted to record a pixel on a recording material, wherein the density levels of the pixels vary, in multiple-step levels, depending upon an amount of conduction current flowing through the recording element;

entering means for entering a plurality of digital image signals, each digital image signal being n bits indicative of $2^n$ density levels of the associated one of a plurality of pixels forming a line of an image; and driving means for sequentially driving said plurality of recording elements block by block in a divided manner in accordance with the digital image signals entered from said entering means, each of said blocks containing m recording elements, said driving means including m current control means, each comprising n switching elements, each operable in response to the associated one bit data of the n bits of the digital image signal, and n resistors, each connected to the associated one of said n switching means, and each of said current control means being adapted to vary, in accordance with $2^n$ step levels, an amount of conduction current flowing through each of the recording elements, in response to the associated digital image signal of n bits.

2. An apparatus according to claim 1, wherein said driving means comprises memory means adapted to serially store the digital image signals entered from said entering means, and wherein said memory means supplies the stored digital image signals in parallel to said current control means.

3. An apparatus according to claim 1, wherein each of said plurality of recording elements is a light emitting diode independently controllable in quantity of light emission, and said recording material is a photosensitive member.

4. An apparatus according to claim 1, wherein said driving means is adapted to drive simultaneously the m recording elements contained in each block.

5. An apparatus according to claim 1, further comprising means for sequentially selecting m recording elements to be driven by said driving means.

6. An apparatus according to claim 1, wherein said n resistors have different resistance values.

7. An apparatus according to claim 6, wherein said memory means is adapted to supply, in parallel, the quantity of digital image signals necessary for driving the m recording elements.

* * * * *